United States Patent [19]

Witt

[11] Patent Number: 4,788,066

[45] Date of Patent: Nov. 29, 1988

[54] PREPARATION OF LOW ALCOHOL BEER

[75] Inventor: Paul R. Witt, Muscatine, Iowa

[73] Assignee: Grain Processing Corporation, Muscatine, Iowa

[21] Appl. No.: 132,427

[22] Filed: Dec. 14, 1987

[51] Int. Cl.$^4$ ............................................. C12C 11/00
[52] U.S. Cl. ........................................ 426/16; 426/14; 426/29; 426/592
[58] Field of Search ....................... 426/11, 12, 14, 16, 426/29, 592, 600

[56] References Cited

U.S. PATENT DOCUMENTS

| | | | |
|---|---|---|---|
| 4,073,947 | 2/1978 | Witt | 426/16 |
| 4,285,975 | 8/1981 | Glenister | 426/16 |
| 4,612,196 | 9/1986 | Goldstein et al. | 426/14 |
| 4,622,224 | 11/1986 | Owades | 426/16 |
| 4,666,718 | 5/1987 | Lowery et al. | 426/13 |
| 4,680,180 | 7/1987 | Bussiere et al. | 426/16 |

OTHER PUBLICATIONS

Lieberman, C. E. "Low Alcohol Beers", Brewer's Digest, May 1984, pp. 30–31.
Parkinson, G. "Beer: Milder Brews Need more CP1 Processing"; Chem. Eng. Oct. 29, 1984, pp. 25, 27 & 29.
Schur, F. "A New Method of Producing Alcohol-Free Beer", EBC Congress 1983.

Primary Examiner—Marianne Cintins
Attorney, Agent, or Firm—Neuman, Williams, Anderson & Olson

[57] ABSTRACT

Beer of low alcohol content is produced by preparing an all-malt brew using a high-temperature-tolerant cellulase. Mashing is conducted at a temperature of approximately 78°–80° C. After mashing, the wort is separated from the mash and fermented with yeast. After fermentation the all-malt beer is supplemented with a low dextrose equivalent (D.E.) starch hydrolyzate, filtered and treated with post-fermentive hopping and malt coloring, if desired. Finally, the drew is diluted with acidified deaerated water so as to contain not more than about 0.5% alcohol by volume.

4 Claims, No Drawings

PREPARATION OF LOW ALCOHOL BEER

This application relates to production of beer having a relatively low content of alcohol.

In recent years beers of reduced calorie content have gained popularity. Similarly, for many beers having reduced alcohol content are preferred. While low alcohol content is desired, the great majority of beer drinkers want the taste and flavor characteristics normally expected with conventional beers having considerably higher alcohol contents, generally on the order of 3.2 to 4.2%.

It is therefore a principal object of this invention to provide a novel process for producing a beer beverage of low alcohol content and having the flavor and taste characteristics of conventional beer.

The present invention produces beer of low alcohol content by a process which involves preparing an all-malt brew using a high-temperature-tolerant cellulase. According to a presently preferred embodiment, barley malt is first mashed for a time with alpha-amylase, a high-temperature-tolerant cellulase added and mashing continued for an additional period at a temperature of approximately 78°–80° C. After mashing, the wort is separated from the mash and fermented with yeast. After fermentation the all-malt beer is supplemented with a low dextrose equivalent (D.E.) starch hydrolyzate, filtered and treated with post-fermentive hopping and malt coloring, if desired. Finally, the brew is diluted with acidified deaerated water so as to contain not more than about 0.5% alcohol by volume.

The preferred process of this invention for producing an all-malt beer of low alcohol content comprises mashing barley malt in water having a pH below 7 with an alpha-amylase enzyme at a temperature of about 78°–80° C. for a time sufficient to liquefy the malt starch. In liquefaction starch granules become swollen and dispersed and liquefaction is generally conducted until after the malt starch has been substantially gelatinized as determined by the nearly complete absence of birefrigence. Malt alphaamylase enzyme is rapidly inactivated at mashing temperatures of 78°–80° C. and thus microbial alpha-amylase is used to accomplish starch liquefaction. After initial mashing with the amylase, further mashing is conducted at 78°–80° C. with a cellulase enzyme which is active at temperatures as high as 80° C. Mashing with the cellulase enzyme is conducted for a time sufficient to reduce the mash viscosity to 50–60 centipoises at 75° C. (Brookfield, 16–17% dissolved mash solids).

The mash water should preferably contain calcium in amounts of about 70 to 80 parts per million and magnesium in amounts of 25 to 30 parts per million and accordingly salts such as calcium sulfate and magnesium chloride can be added, if necessary. To enhance flavor, salts such as potassium phosphate and potassium hydrophosphate salts can be used to provide potassium in amounts ranging from about 200 to 600 parts per million.

The wort is separated from the mash and is fermented with brewer's yeast in manners known to the art. After fermentation, a starch hydrolyzate having a dextrose equivalent value of not more than 25 in aqueous solution is incorporated into the fermented wort to provide from about 4.0 to 5.0%, preferably 4.5%, dissolved solids in the beer. A precipitating agent such as colloidal silica is incorporated into the fermented wort to assist in precipitation of most of the remaining yeast cells and the wort is then filtered and chill-proofed, if desired. Thereafter, the beer is diluted with acidified water to provide a beer having an alcohol content of not more than 0.5% by volume. Known hopping materials and coloring agents can be incorporated in the beer to provide desired bitterness and color and the beer can then be pasteurized and bottled or placed in kegs.

A typical process in accordance with a preferred embodiment of the invention is as follows:

Ground barley malt is mashed at a temperature of about 78°–80° C. in water of suitable pH, e.g., 5.5 to 7.0, containing from about 0.05 to 0.5%, preferably from about 0.1 to 0.2% (based on weight of malt) of a food grade alpha-amylase, such as BAN-120 (*Bacillus subtilus*), available from Novo Inc., Wilton, Connecticut, TENASE, available from Miles Laboratories Inc., Elkhart, Indiana, CANALPHA 600 available from Biocon, Lexington, Kentucky, and the like. After mashing with the amylase for a period on the order of 30 minutes, about 0.05 to 0.5%, preferably 0.1 to 0.2% (based on weight of malt) of a high temperature-tolerant cellulase is added and mashing continued at a temperature of about 78°–80° C. for approximately an additional 30 minutes. A high temperature-tolerant cellulase is one which is not completely deactivated at a temperature of 80° C. Such a preferred cellulase is Laminex, available from Genencor, South San Francisco, which is a cellulase complex obtained from *Trichoderma Resei*.

After mashing with the cellulase the wort is separated from the mash by any suitable means, such as filtration, and is kettle boiled for a period of about 20 to 40 minutes or more. Thereafter, depending on the selected fermentation temperature, the wort is cooled to about 10° to 16° C. while being saturated with sterile air. Higher temperatures, such as 28° to 40° C., can be used although temperatures below about 30° C. are generally considered to be optimum for yeast growth and fermentation. Brewer's yeast at a rate of about $1 \times 10^7$ (corresponds to about ½ pound "wet" yeast per 31 gallons of wort) is added to the wort and fermentation conducted in a suitable fermentation apparatus. Fermentation is considered complete when 20–30% of the initial malt solids have been converted to carbon dioxide and alcohol. Generally, the duration of the fermentation ranges from 2 to 8 days.

The fermented all-wort malt or beer is then stored at a holding temperature of about 0° C. to permit yeast to settle. The holding period or the ruh period may range from 2 to 10 days.

After an appropriate holding period, a low dextrose starch hydrolyzate having a dextrose equivalent value of preferably from about 10 to 20 is added in the form of a sterile solution. The low D.E. starch hydrolyzate is added in an amount sufficient to result in about 10% "true" dissolved solids in the beer. Colloidal silica or diatomaceous earth is added to the wort to agglomerate and precipitate most of the remaining yeast and the beer is then filtered. Commercial chill-proofing may be added at this time, if desired.

After filtration the beer is diluted to not more than about 0.5% alcohol content (volume) with acidified deareated water so as to provide about 4.5% "true" dissolved solids. Appropriate post-fermentive hopping materials can then be added and color can be adjusted with food grade malt coloring. Typical commercially available hopping materials are Pfizer "Isohop", Pfizer "Redihop" and product from Kalsec Co., which are added in amounts sufficient to provide a desired bitterness in the beer. The beer is then carbonated to 2.6-2.8 volumes of carbon dioxide per volume of beer and it can then be pasteurized and placed in bottles or kegs.

EXAMPLE I

Six thousand grams of coarsely ground malt were suspended in 24 liters of water at 80° C. (containing 9 grams anhydrous calcium sulfate). The resulting temperature was 78° C.

9.0 milliliters Novo amylase BAN 120 was added and the mash held 30 minutes at 78° C. With the mash at 78° C., 6.0 milliliters Genecor Laminex were added and mashing continued at 78° C. for an additional 30 minutes.

The hot mash was transferred to a lauter tub which filtered the wort from the grains. The residual extract was separated by sparging with water at 78° C.

To the total all-malt wort (36 liters), contained in a stainless steel jacket kettle, were added 65 grams hop pellets and 3.5 grams anhydrous calcium sulfate. After atmospheric boiling, the kettle was pressurized and boiling (6 pounds pressure) continued for an additional 20 minutes.

After the kettle boil, the wort was transferred to a hot wort tank to permit settling of the "hot break" (coagulum) and then cooled through a tube-in-tube cooling unit to 16° C. with filtered air saturated at that temperature The wort was fermented in vertical tube cylinders (6" diameter) housed in an attempered room at 14° C. Pitching (yeast additions) was accomplished with 125 grams active brewer's yeast cake (about 70% moisture) and fermentation was conducted for 8 days (14°-15° C.).

After fermentation, about 25 liters of the beer was removed from the settled yeast and stored for 8 to 10 days at 0°-1° C. under carbon dioxide pressure. After storage, the alcohol content was 1.5% w/w and Real Extract 6.8% w/w.

Seven liters of this post storage beer were transferred to a Pyrex glass tank. Then 2730 milliliters of a 20% solution of non-waxy starch hydrolyzate having a dextrose equivalent value of about 15 (dissolved in deaerated water and adjusted to pH 4.0-4.1 with $H_3PO_4$) were added. Colloidal silica #1072, in an amount to obtain a concentration of 800 parts per million, as is, vol/vol., was added to precipitate residual yeast and to minimize chill haze precursors.

After treatment this beer was held for 7 days (under carbon dioxide pressure) at 0° C. and analyzed thus:

| Alcohol | 1.36% wt. |
|---|---|
| Real Extract | 10.30% |

7.5 liters of the above beer were diluted with 12.8 liters of deaerated water which had been adjusted to pH 4.0 with $H_3PO_4$. The alcohol content of the beer, after dilution, was found to be 0.51% weight.

Before carbonization and pasteurization, 2.2 milliliters of Pfizer Isohop (post-fermentive isomerized soluble hop extract) and 4.26 grams Williamson malt coloring #310 were added.

This diluted beer was filtered, carbonated and pasteurized. Analysis of the finished beer showed:

| Protein | 0.12% |
|---|---|

-continued

| Alcohol | 0.51% |
|---|---|
| Real Extract | 3.55% |

EXAMPLE II

Eighty grams coarsely ground brewer's malt (5.0% moisture) were mashed into 320 milliliters distilled water at 82° C. The resulting mash temperature was 77° C. No alpha-amylase enzyme was added. Mashing was conducted at 78°-79° C. for 60 minutes. This mash is the control.

Another mashing was conducted as done with the control for the first 30 minutes. Then 0.2% cellulase (Laminex) (malt weight) was added and mashing continued at 78° C. for an additional 30 minutes. Both mashes were diluted to 400 grams with 75° C. distilled water, well mixed and filtered hot through Whatman #1 paper. The filtration rates observed were as follows:

| Sample (100 g mash) | ml filtrate/20 minutes |
|---|---|
| Control | 24 |
| Cellulase | 68 |

The spent grains of the control were thick and "jelly-like" and those from the cellulase brew were comparable to normal spent grains.

Data derived from the mashing procedures of this example is presented in the following table:

|  | Control | Cellulase |
|---|---|---|
| Run-off | Slow | Normal |
| Extract, % dry basis | 63.48 | 72.46 |
| Dextrose equivalent |  |  |
| % dissolved solids | 26.46 | 24.95 |
| wt (as dextrose) 100 ml wort | 3.44 g | 3.55 g |
| Formol Nitrogen, g/100 ml | 0.0434 | 0.0414 |
| Alpha-Amino Nitrogen, ppm | 283 | 269 |
| Wort Viscosity, cp, 20° C. | 1.83 | 1.89 |
| pH | 5.2 | 5.2 |

Wort viscosity for both mashing procedures was about the same, taking into account the higher solids of the cellulase wort. The cellulase mash was more fluid or stirrable and run-off or filtration rate was significantly more rapid with the cellulase wort. The cellulase treatment resulted in about 9% greater extract (78° C. mash) and formol nitrogen (alpha-amino nitrogen) was ample for complete fermentation.

Example II shows that a satisfactory low alcohol beer is produced without first mashing with alpha-amylase. However, mashing with alpha-amylase functions to condition the malt substrate physically for the action of the cellulase. Without using alpha-amylase to liquefy the malt starch, large torque forces may exist in commercial operation causing undue strain and perhaps failure of the brewery mashing equipment. Accordingly, the best mode of the present invention involves first mashing with alpha-amylase.

Those modifications and equivalents which fall within the spirit of the invention are to be considered a part thereof.

What is claimed is:

1. A process for producing an all-malt beer of low alcohol content which comprises:

mashing barley malt in water with an alpha-amylase enzyme at a temperature of about 78°-80° C. in an amount and for a time sufficient to liquefy the malt starch, P1 adding to cellulase enzyme which is not deactivated at temperatures up to 80° C. in an amount sufficient and for a period of time sufficient to reduce the viscosity of the mash to about 50 to 60 centipoises at 75° C., separating wort from the resulting mash, fermenting the separated wort with yeast, separating the fermented wort and yeast, incorporating into the fermented wort a starch hydrolyzate having a dextrose equivalent value of not more than about 25, filtering the fermented wort, and diluting the filtered fermented wort with water to provide a beer containing not more than about 0.5% alcohol by volume.

2. A process in accordance with claim 1 wherein the mash water contains calcium.

3. A process in accordance with claim 1 wherein the mash water contains potassium.

4. A process for producing an all-malt beer of low alcohol content which comprises:

mashing barley malt in water at a temperature of about 78°-80° C. with a cellulose enzyme which is not deactivated at temperatures up to 80° C. in an amount sufficient and for a period of time sufficient to reduce the viscosity of the mash to about 50 to 60 centipoises at 75° C., separating wort from the resulting mash, fermenting the separated wort with yeast, separating the fermented wort and yeast, incorporating into the fermented wort a starch hydrolyzate having a dextrose equivalent value of not more than about 25, filtering the fermented wort, and diluting the filtered fermented wort with water to provide a beer containing not more than about 0.5% alcohol by volume.

* * * * *

UNITED STATES PATENT AND TRADEMARK OFFICE
CERTIFICATE OF CORRECTION

PATENT NO. : 4,788,066
DATED : November 29, 1988
INVENTOR(S) : PAUL R. WITT

It is certified that error appears in the above-identified patent and that said Letters Patent is hereby corrected as shown below:

In the Abstract, line 9, "drew" should be -- brew --

Column 1, line 42, "alphaamylase" should be
            -- alpha-amylase --

Column 5, line 4, delete "P1"

"adding" should begin at the
                    left margin

"to" should  be -- a --

Column 6, line 6, "cellulose" should be -- cellulase --

Signed and Sealed this

Twenty-eighth Day of March, 1989

Attest:

DONALD J. QUIGG

Attesting Officer

Commissioner of Patents and Trademarks